United States Patent
Iqbal et al.

(10) Patent No.: US 12,476,705 B2
(45) Date of Patent: Nov. 18, 2025

(54) SYSTEM AND METHOD FOR BEAM ALIGNMENT

(71) Applicant: ARQIT LIMITED, London (GB)

(72) Inventors: Omar Iqbal, Petersfield (GB); James Kirrane, London (GB); Sam Heselwood, London (GB)

(73) Assignee: Arqit Limited, London (GB)

( * ) Notice: Subject to any disclaimer, the term of this patent is extended or adjusted under 35 U.S.C. 154(b) by 266 days.

(21) Appl. No.: 18/283,868

(22) PCT Filed: Feb. 21, 2022

(86) PCT No.: PCT/GB2022/050467
§ 371 (c)(1),
(2) Date: Sep. 25, 2023

(87) PCT Pub. No.: WO2022/200759
PCT Pub. Date: Sep. 29, 2022

(65) Prior Publication Data
US 2024/0171275 A1 May 23, 2024

(30) Foreign Application Priority Data
Mar. 26, 2021 (GB) .................................... 2104330

(51) Int. Cl.
*H04B 10/00* (2013.01)
*H04B 10/112* (2013.01)
(Continued)

(52) U.S. Cl.
CPC ....... *H04B 10/1123* (2013.01); *H04B 10/118* (2013.01); *H04B 10/70* (2013.01); *H04L 9/0852* (2013.01)

(58) Field of Classification Search
CPC ..................................................... H04B 10/70
See application file for complete search history.

(56) References Cited

U.S. PATENT DOCUMENTS

| 10,826,606 | B1* | 11/2020 | Lundberg | ............... H04B 10/70 |
| 2009/0268276 | A1* | 10/2009 | Lee | ........................ H04B 10/70 |
| | | | | 359/330 |

OTHER PUBLICATIONS

Farr W, "Technology Development for High Efficiency Optical Communications", Aerospace Conf., 2012 IEEE, Mar. 3, 2012, pp. 1-8 (Year: 2012).*

(Continued)

*Primary Examiner* — Daniel G Dobson
(74) *Attorney, Agent, or Firm* — Dentons US LLP

(57) ABSTRACT

A method of aligning a quantum laser beam with a receiver, the method including: generating a quantum laser beam and a first classical, non-quantum, laser beam at a transmitter, the quantum laser beam and the first classical laser beam being substantially aligned in direction; transmitting the quantum laser beam and the first classical laser beam; and directing the quantum laser beam and first classical laser beam to a receiver; measuring the photon reception rate through the quantum laser beam at the receiver, and reporting the photon reception rate to the transmitter; at the transmitter, making a series of adjustments to the direction of the transmitted quantum laser beam and the first classical laser beam, and monitoring the reported photon reception rate; wherein, each of the series of adjustments is based, at least in part, on the effect of the preceding adjustment on the reported photon detection rate.

20 Claims, 6 Drawing Sheets

(51) Int. Cl.
*H04B 10/118* (2013.01)
*H04B 10/70* (2013.01)
*H04L 9/08* (2006.01)
*H04J 14/00* (2006.01)

(56) References Cited

OTHER PUBLICATIONS

Farr W, "Technology development for high efficiency optical communications," Aerospace Conference, 2012 IEEE, IEEE, Mar. 3, 2012, pp. 1-8.
Townes S et al., "The mars laser communication demonstration," Aerospace Conference, 2004, Proceedings, 2004 IEEE, IEEE, Piscataway, NJ, USA, vol. 2, Mar. 6, 2004, pp. 1180-1195.
Olivia Lee et al., "An updated analysis of satellite quantum-key distribution missions," Arxiv.org, Cornell University Library, 201 Olin Library Cornell University, Ithaca, NY, 14853, Sep. 28, 2019.

* cited by examiner

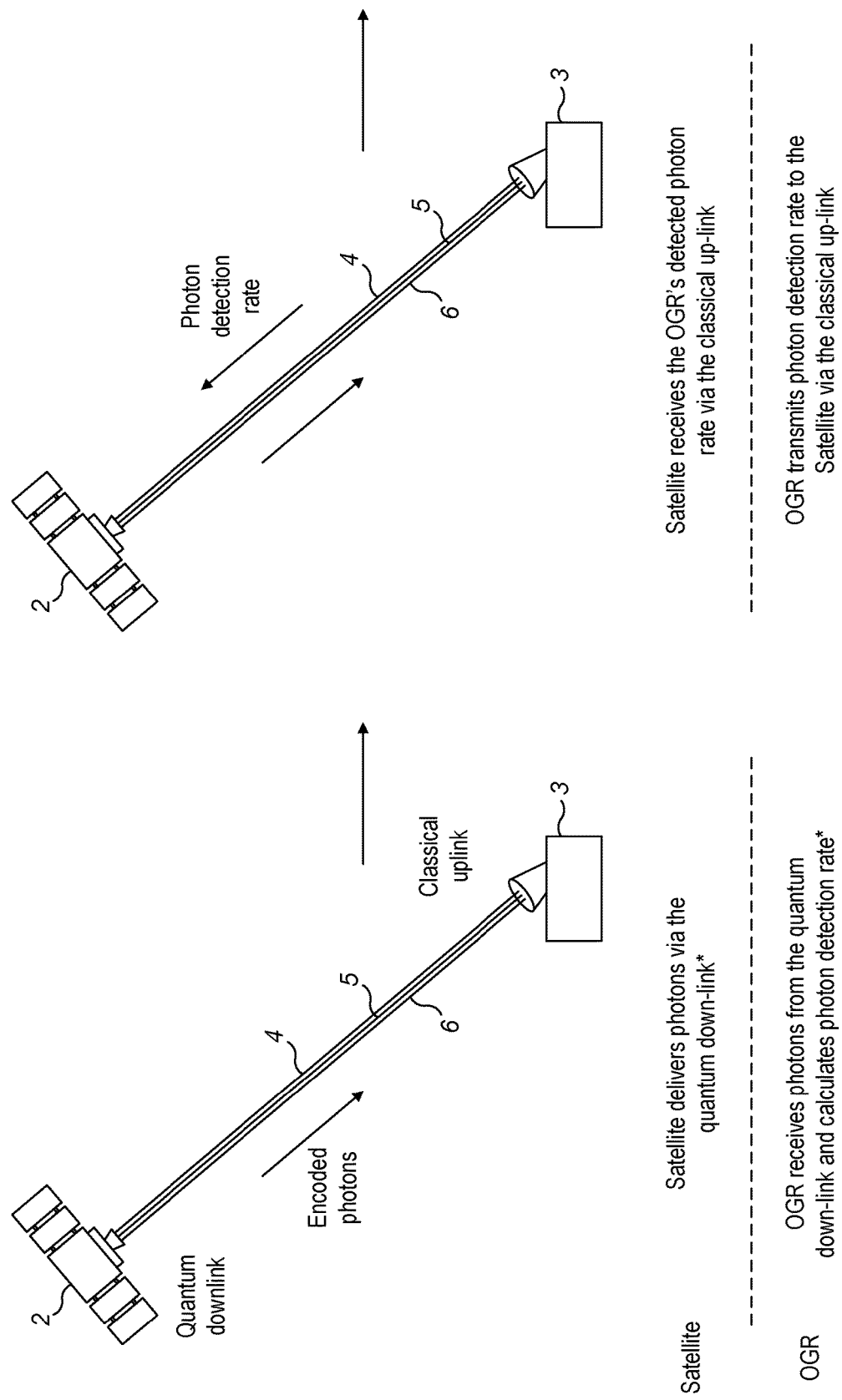

SYSTEM AND METHOD FOR BEAM ALIGNMENT

This application is the National Stage filing under 35 U.S.C. 371 of International Application No. PCT/GB2022/050467, filed Feb. 21, 2022, claims the benefit of GB Application No. 2104330.2, filed Mar. 26, 2021, the contents of which are all hereby incorporated by reference herein in their entirety.

The present application relates to a method, system and software for beam alignment, and in particular for beam alignment in a satellite quantum key distribution system.

BACKGROUND

Cryptography is used to protect billions of transactions every day from, without limitation, for example Transport Layer Security (TLS) for online shopping and banking to ultra-secure government communications. These transactions rely on reliable and secure means for at least two or more transacting parties to share a secret key, enabling encryption of data by one party and subsequent decryption by other parties.

It is expected that when commercially usable universal quantum computers (QC) become available, a variety of types of transactions, tasks and applications including, without limitation, conventional key distribution processes will be vulnerable. QCs can potentially crack many classical cryptography codes almost effortlessly. The conventional manual key distribution process is not quantum secure by its nature of operation, as it is exposed to both quantum electronic and/or physical compromise at several of the steps involved.

It has been proposed to use satellite based quantum key distribution (SQKD) to allow two distant parties to share a key in an information theoretic secure way that is guaranteed by the laws of physics. However, a problem encountered in SQKD is that misalignment of a quantum beam used to transfer encoded photons between a satellite and a ground station can limit the rate at which quantum keys or quantum key data can be transferred between them.

The embodiments described below are not limited to implementations which solve any or all of the problems of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides a method of aligning a quantum laser beam with a receiver, the method comprising: generating a quantum laser beam and a first classical, non-quantum, laser beam at a transmitter, the quantum laser beam and the first classical laser beam being substantially aligned in direction; transmitting the quantum laser beam and the first classical laser beam; and directing the quantum laser beam and first classical laser beam to a receiver; measuring the photon reception rate from the quantum laser beam at the receiver, and reporting the photon reception rate to the transmitter; at the transmitter, making a series of adjustments to the direction of the transmitted quantum laser beam and the first classical laser beam, and monitoring the reported photon reception rate; wherein, each of the series of adjustments is based, at least in part, on the effect of the preceding adjustment on the reported photon detection rate.

In a second aspect, the present disclosure provides system for aligning a quantum laser beam with a receiver, the system comprising: a transmitter arranged to: generate a quantum laser beam and a first classical, non-quantum, laser beam, the quantum laser beam and the first classical laser beam being substantially aligned in direction; transmit the quantum laser beam and the first classical laser beam; and direct the quantum laser beam and first classical laser beam to a receiver; and a receiver arranged to: measure the photon reception rate from the quantum laser beam; and report the photon reception rate to the transmitter; wherein the transmitter is further arranged to make a series of adjustments to the direction of the transmitted quantum laser beam and the first classical laser beam, and monitor the reported photon reception rate; and wherein, each of the series of adjustments is based, at least in part, on the effect of the preceding adjustment on the reported photon detection rate.

In a third aspect, the present disclosure provides a method of aligning a quantum laser beam with a receiver, the method comprising: generating a quantum laser beam and a first classical, non-quantum, laser beam at a transmitter, the quantum laser beam and the first classical laser beam being substantially aligned in direction; transmitting the quantum laser beam and the first classical laser beam; and directing the quantum laser beam and first classical laser beam to a receiver; making a series of adjustments to the direction of the transmitted quantum laser beam and the first classical laser beam; and receiving reports of the photon reception rate from the receiver; wherein, each of the series of adjustments is based, at least in part, on the effect of the preceding adjustment on the reported photon detection rate.

In a fourth aspect, the present disclosure provides a method of aligning a quantum laser beam with a receiver, the method comprising: at the receiver, receiving a quantum laser beam and a classical laser beam from a transmitter; measuring the photon reception rate through the quantum laser beam; and reporting the photon reception rate to the transmitter.

In a fifth aspect, the present disclosure provides a satellite system for aligning a quantum laser beam with a receiver, the system comprising: laser means arranged to generate a quantum laser beam and a classical, non-quantum, laser beam, the quantum laser beam and the classical laser beam being substantially aligned in direction; optical means arranged to transmit the quantum laser beam and the first classical laser beam; and a director arranged to direct the quantum laser beam and first classical laser beam to a receiver; and communication means arranged to receive reports of a photon reception rate through the quantum laser beam from the receiver; wherein the system arranged to make a series of adjustments to the direction of the transmitted quantum laser beam and the first classical laser beam, and monitor the received reports of the photon reception rate; and wherein, each of the series of adjustments is based, at least in part, on the effect of the preceding adjustment on the reported photon detection rate.

In a sixth aspect, the present disclosure provides a ground system for aligning a quantum laser beam with a receiver, the ground system comprising: a receiver arranged to receive a quantum laser beam from a transmitter: measuring means arranged to measure the photon reception rate through the quantum laser beam; and communication means arranged to report the photon reception rate to the transmitter.

In a seventh aspect, the present disclosure provides a computer-readable medium comprising code or computer instructions stored thereon, which when executed by a processor, causes the processor to perform the method according to the third aspect.

In an eighth aspect, the present disclosure provides a computer-readable medium comprising code or computer instructions stored thereon, which when executed by a processor, causes the processor to perform the method according to the fourth aspect.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 3A to 3D illustrate steps of a pointing offset correction process according to an embodiment;

Figure 1:
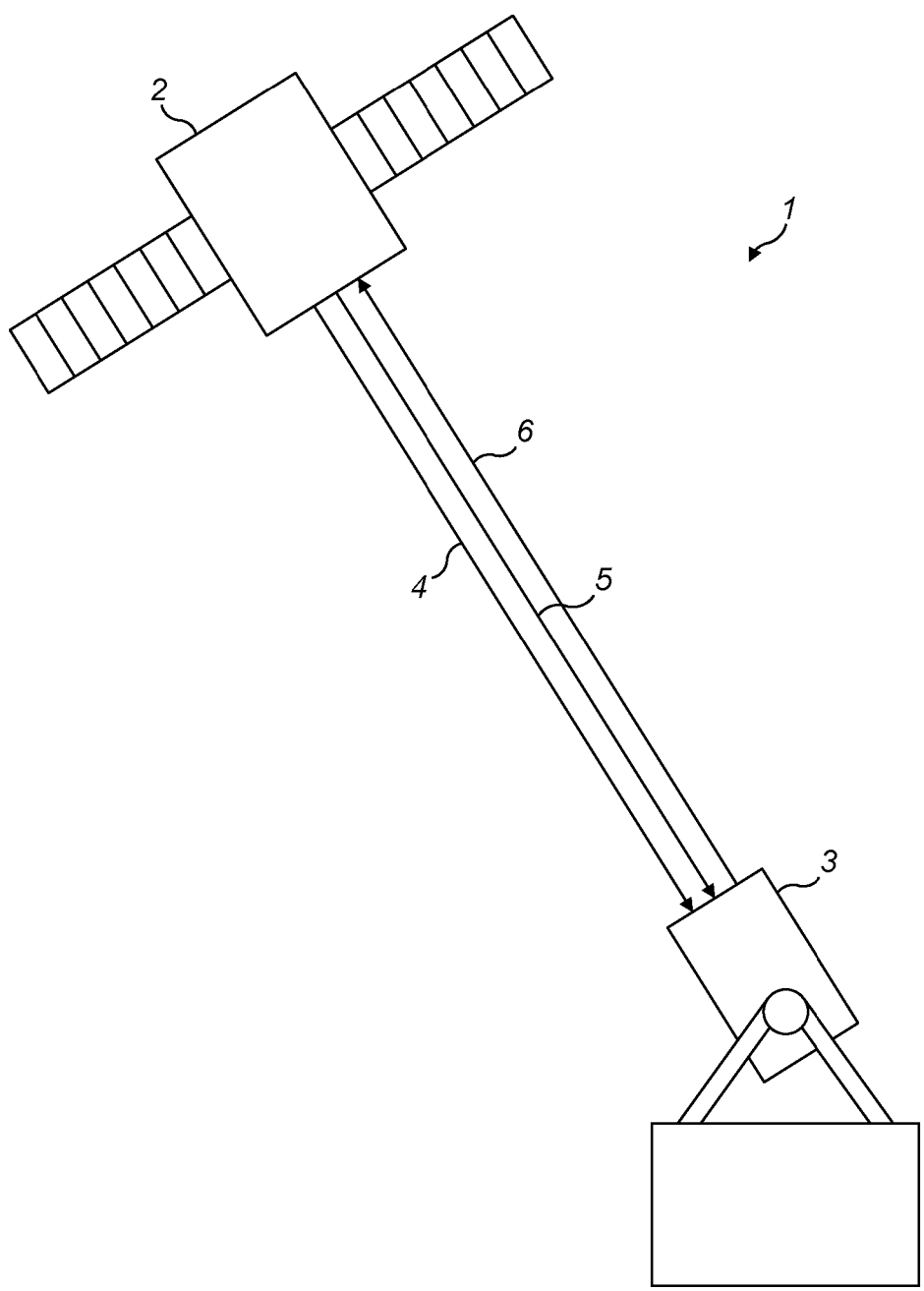
FIG. 1 is a schematic diagram illustrating an overview of a part of a satellite quantum key distribution system according to an embodiment.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic overview of a part of a satellite based quantum key distribution (SQKD) system.

As shown in FIG. 1, satellite based quantum key distribution (SQKD) system 1 comprises a satellite 2 and an optical ground receiver (OGR) 3 at a ground station. During a QKD session, the satellite 2 acts as a transmitter, and sends a quantum laser beam 4 comprising encoded photons down to the OGR 3, which acts as a receiver. The OGR 3 detects the received photons using a photon detection system. The precise nature of the quantum laser beam will depend on the quantum communications protocol being used. For example, in an SQKD system using the BB84 polarisation encoded protocol the encoded photons may each be encoded into one of four polarised channels having different polarisation states (typically horizontal, vertical, diagonal and anti-diagonal polarisations) by the satellite 2, and the OGR 3 will comprise four single photon detectors for respectively detecting photons in the four polarised channels. In such a system, the satellite 2 will further comprise means to determine the transmission time of photons along each of the four polarised channels, and the OGR 3 will further comprise means, such as time-tagging and post-processing firmware, for determining the arrival time of the photons along each of the four polarised channels, and for matching the transmitted and received photons. In some examples, the BB84 protocol may further employ both signal and decoy photons, for a total of eight channels. In another example, in an SQKD system using the BB92 entanglement based protocol there may be two separate quantum beams 4 from the satellite 2 to each of two different OGRs 3, and each quantum beam may be a single channel. In such an SQKD system there will be signal and idler photons (i.e. the results from the pair) routed through independent optical terminals to form different quantum beams to different OGRs. These different quantum beams will require independent alignment.

The satellite 2 also sends a downlink laser beam 5 to the OGR 3, and the OGR 3 sends an uplink laser beam 6 to the satellite 2, to form a bi-directional classical optical communication link. The satellite 2 and OGR 3 comprise means for negotiating encryption keys based on the photons received through the quantum beam 4, the negotiation being carried out using the bi-directional classical optical communication link. In order to allow the quantum laser beam 4 and the downlink laser beam 5 to be separated at the OGR 3 they have different wavelengths. In the illustrated example the quantum laser beam 4, the downlink laser beam 5, and the uplink laser beam 6 are all substantially co-axial, although this is not essential, and in other examples the beams may be parallel and spaced apart.

In the SQKD system 1 the satellite 2 and the OGR 3 cooperate to perform Pointing, Acquisition and Tracking (PAT) to establish and maintain a unidirectional space-to-ground quantum optical link and a bidirectional classical optical link between the satellite 2 and the OGR 3. As mentioned above, the unidirectional space-to-ground quantum optical link enables the delivery of encoded photons to the OGR 3 to generate Quantum Secure Keys. The bidirectional classical optical link enables the exchange of QKD data between the satellite 2 and the OGR 3 to support executing the QKD protocols, for example key sifting and negotiation. The satellite 2 and the OGR 3 use the lasers forming the bidirectional classical optical link as beacons, or master signals, for initial acquisition and maintaining co-alignment of the space based and ground based links forming the bidirectional optical link, as will be explained in more detail below.

The performance of the SQKD system 1 is highly dependent on how accurately the quantum laser beam(s) can be pointed toward the optical receiver, such as the optical telescope, of the OGR 3. Any alignment offset can have a dramatic impact on the achieved rate of transmission of encryption keys or key data, commonly referred to as the Key Rate, particularly if the quantum beam has a non-flat beam shape. Ideally, the centre of the quantum beam should precisely hit the centre of the OGR 3, allowing collection of photons at the highest rate. It will be understood that for a quantum laser beam sending encoded photons from the satellite 2 to the OGR 3 any directional offset of the quantum beam from the OGR 3 will reduce the rate at which the encoded photons are successfully received by the OGR 3, which will in turn reduce the Key Rate.

In practice, there will generally be some directional misalignment between the quantum beam and a classical laser used as a beacon for the alignment process outputs of the Satellite's optical terminal. This misalignment will compromise the overall rate of successfully received photons, and thus the Key Rate, which is directly proportional to this, reducing it below the rate which could, in theory, be attained. In overview, the approach used is to maximise the rate of received photons at the OGR by prioritising co-alignment with the Satellite's quantum downlink, as opposed to the co-alignment of the classical downlink used in current systems.

It will be understood that the SQKD system 1 has many additional elements which are not shown in FIG. 1, and will not be described herein. FIG. 1 is merely an explanatory diagram to assist in explaining the requirement for correct alignment of the quantum beam between the satellite 2 and the OGR 3.

Optical SQKD relies on the precise pointing of lasers between the Satellite 2 and the OGR 3 to exchange quantum state information encoded onto the photons of a quantum beam. QKD sources generate multiple laser beams which must be precisely co-aligned in order to reduce signal loss at the ground station, and prevent mutual information leakage through induced spatial differences in each encoded photon. Such induced information leakage could be used to compromise the security of the generated quantum encryption keys.

Depending on protocol and topology, SKQD also relies on the exchange of other information, for example, for precise time synchronisation between source and receiver, and post processing exchanges to distil or produce Secure Keys from the transmitted photons. This information exchange may be encoded onto classical lasers also transmitted between the satellite and ground station. Such lasers must also be precisely pointed to reduce signal loss to the ground. It is not feasible in practice for individual optical terminals to be built for each separate laser with independent pointing mechanisms, both for cost and payload/space reasons, and because of interference and cross talk between the different pointing mechanisms. Hence, multiple lasers with different characteristics (such as wavelength, polarisation, etc.) must be precisely co-aligned and pointed to the ground station through a single optical terminal.

Figure 2:
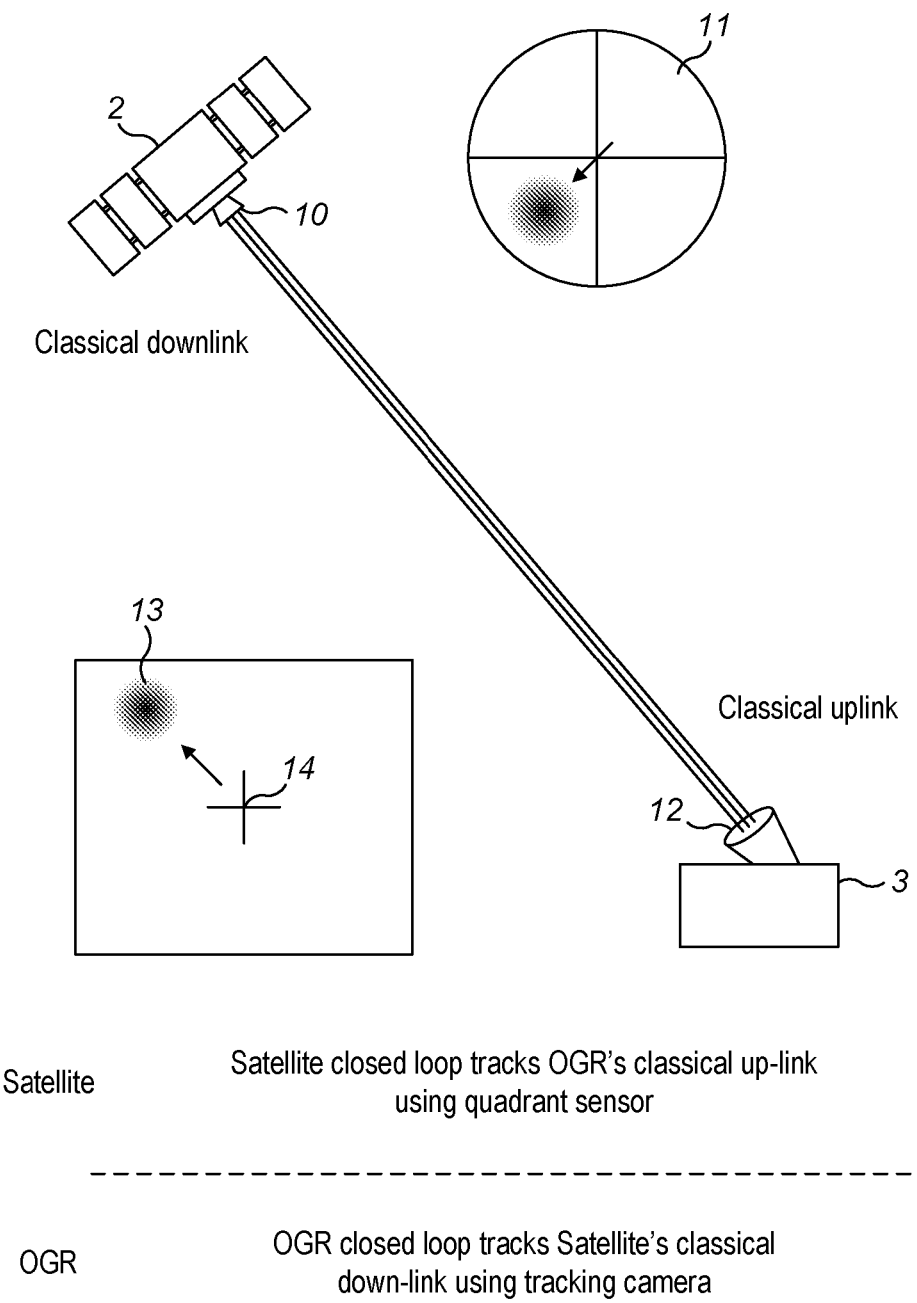
FIG. 2 is a schematic diagram illustrating how a bidirectional optical link is maintained in the system of FIG. 1.

FIG. 2 shows a schematic diagram of how co-alignment of the space based and ground based links forming the bidirectional optical link is maintained by the satellite 2 and the OGR 3.

The satellite 2 comprises an optical terminal 10 incorporating an optical telescope, and having a coarse pointing system and a fine pointing system able to direct the optical telescope. The optical telescope is used by the satellite 2 to transmit the quantum laser beam 4 and the downlink laser beam 5, and to receive the uplink laser beam 6.

Initially, the optical terminal 10 of the satellite 2 uses the coarse pointing system to point the optical telescope in the direction of the OGR 3 in an open loop manner based upon a determination of the expected position of the OGR 3 relative to the satellite 2. This relative position is determined from the known geographical location of the OGR 3, the known orbital path of the satellite 2, for example as defined by the epherimis of the satellite 2, and the time. Such open loop position determination and pointing is well known, and does not need to be described in detail herein. This initial pointing of the optical terminal 10 of the satellite 2 only needs to make the uplink laser beam 6 visible to the satellite 2, so great accuracy is not required.

When the optical telescope of the optical terminal 10 is pointing in the direction of the OGR 3 and the uplink laser beam 6 from the OGR 3 is acquired, the satellite 2 employs a further closed loop pointing method to provide more accurate pointing of the optical telescope, using the uplink laser beam 6 as a beacon. The satellite 2 comprises a coarse pointing receiver including a quadrant sensor 11, which is arranged to receive at least a portion of the uplink laser beam 6 received at the optical telescope of the satellite 2 from the OGR 3. After acquisition of the uplink laser beam 6 has been achieved, the satellite 2 continues to monitor the strength of the received uplink laser beam 6 signal received by each quadrant of the quadrant sensor 7. The satellite 2 then uses a coarse pointing system to adjust the pointing direction of the optical telescope, and thus the transmission direction of the classical downlink laser beam 5 and the quantum laser beam 4, in favour of the strongest quadrant of the quadrant sensor 7, that is, the quadrant receiving the greatest proportion of the uplink laser beam 6. The pointing of the optical telescope may, for example, be adjusted using beam steering mirrors of the optical terminal 10. In some examples, the pointing of the optical telescope may be adjusted to point to an anticipated future position of the OGR 3, based on the known orbital path of the satellite 2, rather than the current position, in order to allow for time delays in the closed loop. This is commonly referred to as a point ahead approach. In some examples a separate point ahead mechanism may be used to apply this adjustment.

The OGR 3 comprises an optical telescope 12 and a pointing system, also including a point ahead assembly, able to direct the optical telescope 12. The optical telescope 12 is used by the OGR 3 to receive the quantum laser beam 4 and the downlink laser beam 5, and to transmit the uplink laser beam 6.

The coarse pointing system of the OGR 3 points the optical telescope in the direction of the satellite 2 in an open loop manner based upon a determination of the expected position of the satellite 2 relative to the OGR 3. This relative position is determined from the known geographical location of the OGR 3, the known orbital path of the satellite 2, for example as defined by the epherimis of the satellite 2, and the time. Such open loop positional determination and pointing is well known, and does not need to be described in detail herein. This initial pointing of the optical telescope of the OGR 3 only needs to make the downlink laser beam 5 visible to the OGR 3, so great accuracy is not required.

When the optical telescope 12 is pointing in the direction of the satellite and the downlink laser beam 5 is acquired, the OGR 3 employs a further closed loop pointing method to provide more accurate pointing of the optical telescope 12 using the downlink laser beam 5 as a beacon. The OGR 3 comprises a tracking camera viewing through the optical telescope 12, which is arranged to image the downlink laser beam 6 received from the satellite 2. After the image of the downlink laser beam 5 has been acquired, the OGR 3 adjusts the pointing direction of the optical telescope 12, and thus transmission direction of the uplink laser beam 6, using the coarse pointing system of the point ahead assembly, to keep the image 13 of the satellite 2 at a reference point 14 of the tracking camera view, which reference point 14 corresponds to the axis of the optical telescope 12. In some examples, the pointing of the optical telescope 12 may be adjusted to point to an anticipated future position of the satellite 2, based on the known orbital path of the satellite 2, rather than the current position, in order to allow for time delays in the closed loop. This is commonly referred to as a point ahead approach.

Accordingly, the satellite 2 and the OGR 3 have independent functions which maintain the co-alignment of the downlink laser beam 5 and the uplink laser beam 6, and also maintain the alignment of the quantum beam 4, which is coaxial with the downlink laser beam 5.

FIG. 2 shows a single bidirectional optical link between a single satellite 2 and a single OGR 3. The arrangement of FIG. 2 will be repeated for each bidirectional optical link between the satellite 2 and an OGR 3 for systems where the satellite 2 communicates with multiple OGRs 3 simultaneously, such as systems using the BB92 entanglement based protocol as discussed above.

It is not essential to use the specific Pointing, Acquisition and Tracking (PAT) method described above. Other PAT methods may be used to align the uplink and downlink laser beams. Generally, quadrant sensors are smaller, simpler, and lower in mass than tracking camera systems, while having a poorer performance. As a result it may, in some examples, be advantageous to use a quadrant sensor on the satellite, where space, reliability, and mass are at a premium, and to use a tracking camera system at the OGR on the ground, where these factors may be less important than higher performance. However, this is not essential. In other examples it may be preferred to use any one of a quadrant sensor, a tracking camera, or an alternative means, for closed loop tracking at either of the satellite or the OGR. Further, in some examples it may be preferred to use the same means for closed loop tracking at both the satellite and the OGR.

As is explained above, in order to allow the quantum laser beam 4 and the downlink laser beam 5 to be separated to be separated at the OGR 3 they have different wavelengths. Accordingly, the satellite 2 comprises a quantum laser to generate the quantum laser beam 4 and a separate classical laser to generate the downlink laser beam 5. The output beams of the quantum laser and the classical laser are co-aligned by the optics of an optical assembly. In the illustrated example the optical assembly aligns the quantum laser beam(s) to the classical laser beam and then injects the co-aligned laser beams into the optical terminal 10 for transmission.

The optical telescope 12 and associated receiver optics of the OGR 3 are arranged to receive and split or separate the quantum laser beam 4 and the downlink laser beam 5 from the satellite 2 based upon their different wavelengths. The OGR 3 comprises a classical laser to generate the uplink laser beam 6. The optical telescope 12 and associated receiver optics of the OGR 3 are further arranged to transmit the uplink laser beam 6 to the satellite 2.

The satellite 2 and the OCR 3 each comprise a classical optical communication system to support the bi-directional classical optical communication link. Each classical optical communication system may comprise one or more transceivers and one or more optical amplifiers.

As is discussed above, the performance of the SQKD system 1, in terms of the key rate at which encryption keys or key data can be delivered to the OGR 3, is highly dependent on how accurately the quantum laser beam(s) 4 can be pointed toward the OGR 3. This performance, in turn, impacts how long an SQKD communication session is required in order to provide a desired number of quantum encryption keys to the ground terminal, and how many satellites 2 are required to service the OGRs 3 at the ground stations of the SQKD system 1.

It has been identified that although the quantum beam 4 should be accurately pointed at the optical telescope 12 of the OGR 3 by the arrangements discussed above, the performance or key rate attainable be an SQKD system may still be limited by pointing error of the quantum beam 4. It has been determined that in practice this pointing error may arise due to a pointing offset of the quantum beam 4 relative to the downlink beam 5, and jitter in the pointing of the optical terminal 10 of the satellite 2.

The pointing offset of the quantum beam may arise from the contribution of a number of different parameters. These may include micro-vibration, thermo-elastic effects and mechanical settlings in the optical terminal and the quantum payload of the satellite producing the quantum beam. These different parameters may vary slowly over time in their contribution to the pointing offset, and may have time constants of a few minutes and above. The jitter is mostly produced by the pointing mechanism of the satellite optical terminal. This is substantially set by the design and manufacturing quality of the satellite optical terminal, and there is little that can be done to improve this once the satellite and optical terminal have been constructed. However, if the pointing offset can be reduced, the overall performance (such as the key rate) of the SQKD system can be improved, even if there is still jitter.

FIGS. 3A to 3D are schematic diagrams showing a stages of correction of pointing offset of the quantum beam 4 in the SQKD system 1 according to a closed-loop compensation method carried out by the satellite 2 and the OGR 3 in concert.

An overview of this approach is that the PAT system associated with the classical bi-directional communication or beacons system is modified to carry out an adjustment associated with single photon receive information.

In FIG. 3A, as a first step, the satellite 2 and OGR 3 have aligned the quantum beam 4, downlink laser beam 5 and uplink laser beam 6 by a double closed loop procedure as described above, using the downlink laser beam 5 and uplink laser beam 6 as beacons for the alignment process. Typically, this is carried out by a conventional PAT system as discussed above. In this aligned state, the satellite 2 transmits encoded photons using the satellite payload optical terminal 10 via a quantum downlink formed by the quantum beam 4, as discussed above for normal SQKD operation. The OGR 3 receives the quantum beam 4 and detects the encoded photons through the quantum downlink from the satellite 2, as discussed above for normal SQKD operation.

The photon detection system of the OGR 3 which detects the encoded photons periodically calculates the photon detection rate, that is, the number of encoded photons detected per unit time. As is explained above, the detected photons are time-tagged to determine their arrival time so that transmitted and received photons can be matched, and as a result of this time-tagging the number of photons detected in any specific time period can be readily determined. In the illustrated example the photon detection rate is calculated based on the number of photons detected over a configurable time period set by the satellite 2. In the illustrated example this configurable time period may be set to a default value of around 100 ms. The configured time period can be changed by the satellite 2 and the new required time period value communicated to the OGR 3 from the satellite 2 via the classical downlink laser beam 5 of the bi-directional classical optical communication link, which has been established as discussed above.

In FIG. 3B, as a second step, at the end of each configured time period, the OGR 3 reports the photon detection rate to the satellite 2 via the uplink laser beam 6 of the bi-directional classical optical communication link between the satellite 2 and the OGR 3. In the illustrated example, the SQKD system 1 uses the BB84 polarisation encoded protocol and the calculated and reported photon detection rate is the aggregate photon detection rate across all four polarization channels.

The satellite 2 receives the reported photon detection rate via the uplink laser beam 6 of the bi-directional classical optical communication link, which has been established as discussed above.

Figure 3C:
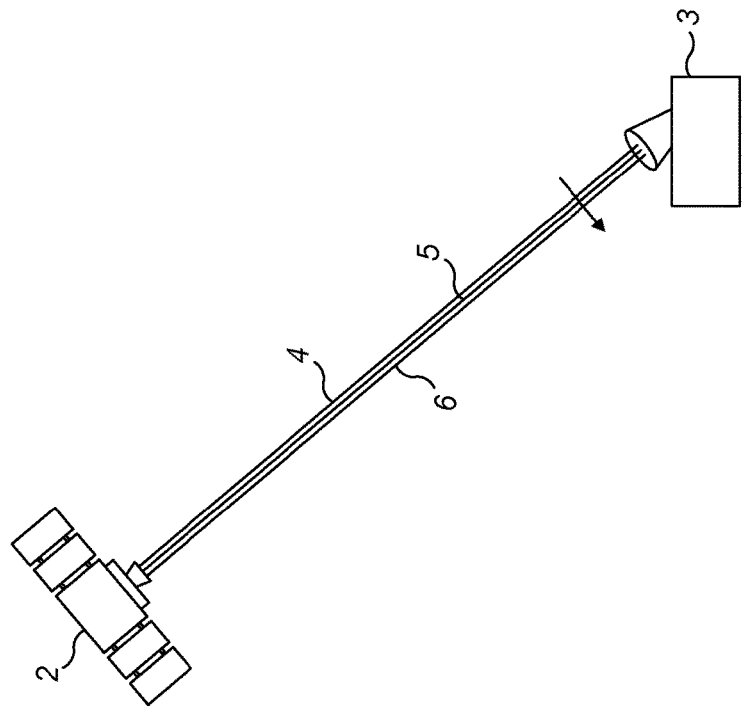

As shown in FIG. 3C, the satellite 2 makes a series of small random adjustments to the pointing direction of the satellite optical terminal 10, which changes the pointing direction of the quantum beam 4 and the downlink laser beam 5. In the illustrated example, the satellite 2 makes a random adjustment to the pointing direction, and instructs the OGR 3 to calculate the photon detection rate over a required time period value following the adjustment, this instructed required time period value being the value of the configurable time period discussed above. The timing of the random adjustments to the pointing direction and the configurable time periods used to calculate the photon detection rate are synchronised so that the pointing direction is not adjusted during the configurable time periods. It will be understood that if the pointing direction were adjusted while the photon detection rate was being calculated this could render the photon rate calculation unreliable and unclear. The OGR 3 monitors the detected photons, determines the photon detection rate over the instructed configurable time period, and reports the photon detection rate back to the satellite 2. The satellite 2 then reviews the effect of the most recent adjustment of the pointing direction on the photon detection rate, and uses this effect to inform the next adjustment, so that each adjustment is based, at least in part, on the effect of the previous adjustment on the measured and reported photon detection rate. The effect may, for example by the amount and/or direction of any change in the photon detection rate. In the illustrated example, the satellite 2 comprises an additional fine pointing system, separate from and mounted on the coarse pointing system, to make these small random adjustments. In the illustrated example, the random adjustments to the pointing direction are in the range 0.1 to 1 μrad.

Steps 1 and 2 as shown in FIGS. 3A and 3B are then repeated for the new, adjusted pointing direction.

Figure 3D:
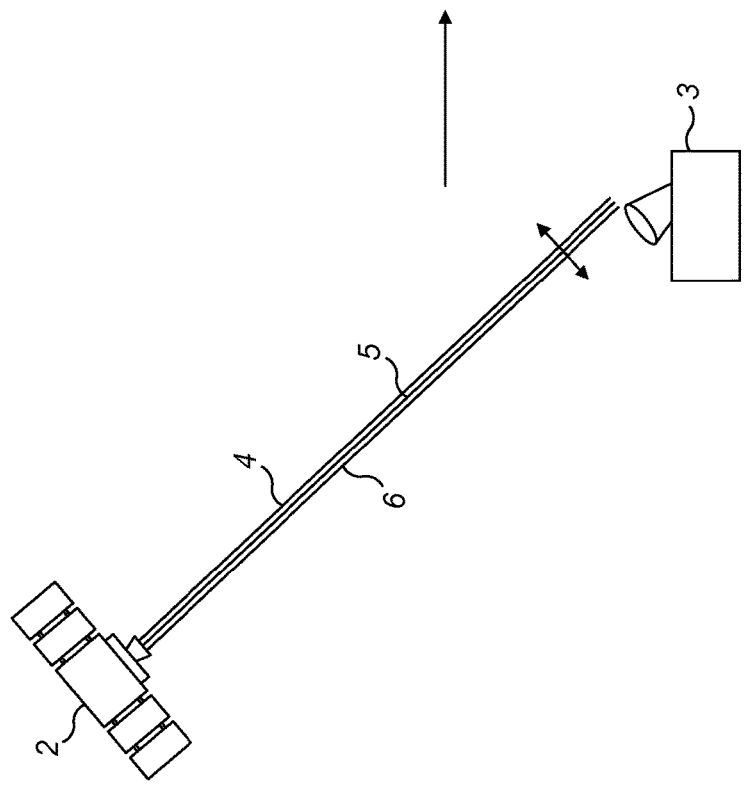

As shown in FIG. 3D, the satellite 2 makes a series of adjustments to the pointing direction of the satellite optical terminal 10. After each adjustment is made, the satellite 2 receives a reported photon detection rate from the OGR 3, and the satellite 2 then makes a further adjustment determined by an algorithm, or other decision making process, which determines the further adjustment based, at least in part, on the change in the reported photon detection rate produced by the preceding adjustment.

In one example, the adjustments to the pointing direction of the satellite optical terminal 10 are made in using a 'random walk' type process wherein, if a random adjustment results in a reduction in the reported photon detection rate, or no change, that random adjustment is reversed. Alternatively, if a random adjustment results in an increase in the reported photon detection rate, the random adjustment is retained. In both cases the random adjustment process is then continued, starting from the pointing direction following reversal of the previous adjustment, or from the new position following the previous adjustment, as appropriate.

Throughout the process illustrated above in FIGS. 3A to 3D, the conventional PAT system continues to align the downlink laser beam 5 and uplink laser beam 6 by the double closed loop procedure described above. However, the adjustment produced by the method of FIGS. 3A to 3D is applied as an offset to the pointing direction of the downlink laser beam 6 to correct the pointing offset of the quantum beam 4. It should be understood that because the conventional closed loop PAT tracking at the satellite 2 is based on the classical uplink laser beam 6 transmitted by the OGR 3 and received by the satellite 2, while the closed-loop compensation method of FIGS. 3A to 3D adjusts the alignment of the quantum beam 4 and the classical downlink laser beam 5, the closed-loop compensation method should not interfere with the conventional closed loop PAT tracking. In other words, the conventional closed loop PAT tracking at the satellite 2 will not respond to the adjustments made by the closed-loop compensation method, for example by attempting to reverse the adjustments.

Over time, this procedure of making a series of adjustments to the pointing direction of the satellite optical terminal 10 where each adjustment is based on the change in the reported photon detection rate produced by the preceding adjustment will lead the satellite 2 to an optimal alignment of the quantum beam 4 with the optical telescope, or other optical receiver, of the OGR 3, and to maximise the performance or key rate of the SQKD system 1.

In the example of a random walk type process, it will be understood how the procedure of making random adjustments to the pointing direction of the satellite optical terminal 10 and reversing changes which reduce the photon detection rate will gradually lead the satellite 2 to an optimal alignment of the quantum beam 4 with the optical telescope, or other optical receiver, of the OGR 3, and to maximise the performance or key rate of the SQKD system 1.

As discussed above, there will generally be a pointing offset between the quantum beam 4 and the downlink laser beam 5, which the described compensation method is intended to correct for. Accordingly, this process of more accurately aligning the quantum beam 4 will slightly misalign the downlink laser beam 5 from the optical telescope, or other optical receiver, of the OGR 3. However, the bi-directional classical optical communication link is much less sensitive to such misalignment than the quantum beam 4, so that this is not expected to be a problem in practice. It will be understood that in operation the maximum offset applied by the compensation method must be small enough that the downlink laser beam 5 is still received at the OGR 3 sufficiently well for the conventional closed loop PAT tracking to be carried out. However, it is generally attempted to make the pointing offset between the quantum beam 4 and the downlink laser beam 5 as small as possible in the design and manufacture of the satellite 2, so that in practice it is not expected that the offset applied will be sufficient to disrupt the PAT tracking.

The frequencies, time periods, and adjustment amounts set out above are not essential and are given by way of example only. Different values may be used in other examples.

The configurable time period set by the satellite 2 for the calculation of the photon detection rate may be set by the satellite to ensure that the photon rate monitoring and the adjustments to the pointing offsets do not occur at the same time, or conflict with each other for any other reason, or conflict with other activities being carried out by the satellite 2 and the OGR 3, and to enable robust feedback control.

In the embodiment described above, the time period for the calculation of the photon detection rate is a configurable time period set by the satellite 2 and communicated to the OGR 3. In other examples, the time period for the calculation of the photon detection rate may be a fixed time period. In some examples this fixed time period may be 100 ms.

The present approach provides a number of advantages. By using the present approach of closed loop alignment of the quantum beam itself, based on the photon detection rate, all alignment errors of the quantum beam which have reasonably long time constant may be eliminated. It will be understood that quickly changing alignment errors may not be correctable by this approach, and may be regarded as jitter. The illustrated example of FIGS. 3A to 3D is able to correct alignment errors with a time constant greater than about 1 minute. The present approach is able to correct for alignment errors in operation, so that no dedicated calibration operation of the pointing offsets of the optical terminal is required. This maximises the availability of the satellite to carry out QKD sessions to deliver Quantum Secure Keys to the customer, because such dedicated calibration operations would reduce the availability of the satellite for SQKD sessions. The present approach is able to correct for unknown or unidentified sources of pointing error of the quantum beam, such as thermal effects. Further, the present approach is able to correct the alignment of the quantum beam received at the OGR, so that sources of pointing error outside the satellite, such as atmospheric effects, can be corrected for. Although the present approach increases the complexity of the satellite and OGR in implementation, is improves performance of the system and reduces operational complexity, for example by not requiring dedicated calibration sessions to be scheduled.

The present approach optimizes the pointing of the quantum beam, and so may maximise the key throughput rate of the SQKD system. The present approach provides robustness in the system to changes over time or in the environment, such a thermal/temperature changes, which could lead to variation in the relative alignments of the different laser beams of the SQKD system.

As part of the design of the system 1 it will be necessary to ensure that all of the quantum beam 4, downlink laser beam 5, and uplink laser beam 6 are received with sufficient strength to carry out the necessary communications and pointing tasks. This is commonly referred to as closing the link budgets. As is explained above, the optimizing of the pointing of the quantum beam 4 implies that the downlink laser beam 5 will be misaligned by an angle corresponding to the offset between the quantum beam 4 and the downlink laser beam 5. However, the downlink laser beam 5 will generally be less effected by small amounts of misalignment than the quantum beam 4, so that it will generally be an acceptable trade off to prioritize the pointing of the quantum beam in this way. It is generally straightforward to ensure that the signal from the downlink laser beam is sufficiently strong that it can be detected with enough bandwidth for the required communications traffic.

In the example described above of a random walk method, when a random adjustment results in a reduction in the reported photon detection rate, or no change, that random adjustment is reversed, and if a random adjustment results in an increase in the reported photon detection rate, the random adjustment is retained. In other examples, when a random adjustment results in a reduction in the reported photon detection rate, that random adjustment is reversed, and if a random adjustment results in no change, or an increase, in the reported photon detection rate, the random adjustment is retained.

In some examples, the satellite 2 may take into account known changes in the operation of the SQKD system 1 which are expected to change the photon detection rate at the OGR 3. In such examples, the satellite 2 may determine a predicted photon detection rate from the previous photon detection rate and the expected change in photon detection rate due to the known changes, and compare the newly reported photon detection rate to this predicted photon detection rate instead of the previous photon detection rate. For example, the distance between the satellite 2 and the OGR 3 will change as the satellite 2 moves along its orbit, and this may change in distance may affect the likelihood of encoded photons of the quantum beam 4 being successfully received at the OGR 3. Such changes in distance, and their effects, can be easily predicted because the orbital path of the satellite 2 is highly predictable. In another example, the opacity of the atmosphere along the beam path between the satellite 2 and the OGR 3 may change due to dust, clouds or mist, and affect the likelihood of encoded photons of the quantum beam 4 being successfully received at the OGR 3. Such changes may, for example, be detected from changes in the received intensity of the downlink laser beam 5 and the uplink laser beam 6, or by dedicated sensors.

Alternatively, in some examples the satellite 2 continuously monitors the reported photon detection rate received from the OGR 3 as the random adjustments to the pointing direction of the satellite optical terminal 10 are made, and if a random adjustment results in a reduction in the reported photon detection rate, or no change, that random adjustment is reversed only if there are no known changes in the operation of the SQKD system 1 which are expected to reduce the photon detection rate, or to reduce the photon detection rate by that amount.

The satellite 2 may retain a record of the total (net) change in pointing direction corresponding to the optimal alignment of the quantum beam 4 finally arrived at relative to the initial pointing direction based on aligning the downlink laser beam 5 and the uplink laser beam 6. This total change may be regarded as a pointing direction offset between the quantum beam 4 and the downlink laser beam 5. The satellite 2 may then apply this recorded change at the start of a subsequent SQKD communication session, after carrying out alignment using the downlink laser beam 5 and the uplink laser beam 6, but before beginning the random adjustment process. This may allow persistent alignment errors to be corrected for, and allow an optimal alignment of the quantum beam 4 to be achieved more quickly.

In some examples where the change in pointing direction is recorded, this may be applied to the next SQKD session by the satellite with any OGR 3. In other examples, the satellite 2 may separately record the change in pointing direction for each OGR 3 of the SQKD system 1, and apply this to the next SQKD session by the satellite 2 with that specific OGR 3. In further examples, the change in pointing direction may be recorded and re-used in a more complex manner, where a database of variation of pointing offset with various parameters, such as time, satellite thermal environment or orientation of the optical terminal towards a specific OGR 3 is maintained based upon an analysis of historic changes in pointing direction, and used by the satellite 2. In some examples, such a database may be maintained and updated between SQKD sessions by the satellite, or elsewhere in the SQKD system 1, such as at a central control station, and uploaded to the satellite 2.

In the example described above the timing of the random adjustments to the pointing direction and the configurable time periods used to calculate the photon detection rate are synchronised so that the pointing direction is not adjusted during the configurable time periods. In some examples this synchronisation may be carried out without a configurable time period being determined. For example, in some alternative examples, a communication may be sent from the satellite 2 to the OGR 3 indicating that the pointing direction is about to be adjusted, so that the OGR 3 should stop the photon rate monitoring. Other methods may also be used.

Figure 4:
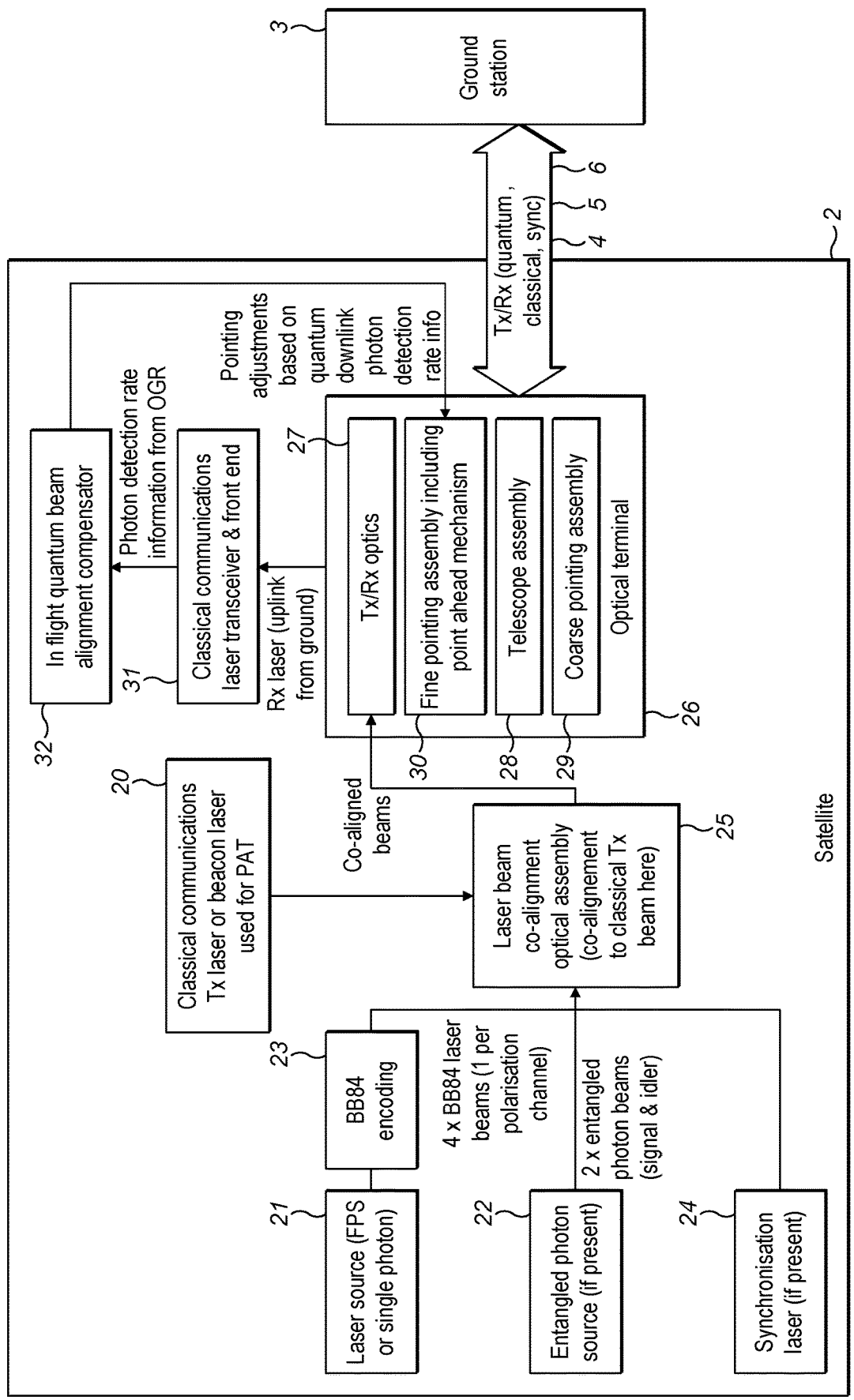
FIG. 4 is a more detailed schematic diagram of a satellite able to carry out the process of FIGS. 3A to 3D.

FIG. 4 shows a more detailed schematic diagram of a satellite 2 arranged to carry out quantum beam alignment according to the method of FIGS. 3A to 3D.

The satellite 2 comprises a classical optical communication laser 20, which produces the downlink laser beam 5. The satellite 2 further comprises a faint laser source 21, which produces faint photon events, and may be used to produce the quantum beam 4. The faint laser source 21 may, for example, be a faint pulse source (FPS) or a single photon source. The satellite 2 further comprises an entangled photon laser source 22, which may be used to produce the quantum beam 4. In operation of the satellite 2, for an SQKD session with a particular OCR 3, the satellite 2 will use one of the faint laser source 21 and the entangled photon laser source 22 to form the quantum beam 4, as desired.

In the illustrated example, the faint laser source 21 operates using the BB84 polarisation encoded protocol, and the satellite 2 further comprises a BB84 encoding module 23 to encode the faint photon events produced by the faint laser source 21.

Optionally, the satellite 2 may further comprise a synchronisation laser 24, which produces synchronisation laser pulses which may be used to synchronise timings at the satellite 2 and an OGR 3.

In the illustrated example the satellite comprises both a faint laser source 21 and an entangled photon laser source 22. This is not essential, in some examples one of the faint laser source 21 and the entangled photon laser source 22 may be omitted.

The satellite 2 further comprises an optics assembly 25 and an optical terminal 26. The optics assembly receives laser beams emitted by the classical optical communication laser 20 and whichever of the lasers 21, 22 and 24 are present and operating. The optics assembly 25 uses the beam from the classical optical communication laser 20 as a reference or beacon, and aligns the other laser beams to this beam to fine tolerances before injecting the aligned co-axial beams into the optical terminal 26 in such a manner that their pointing to the OGR 3 of the ground station can be co-managed. Several approaches to such an optical assembly 25 can be envisaged incorporating mechanism which might include pinholes, focusing lenses, mirrors etc. Optionally, in some examples the optics assembly 25 may also incorporate active precision measurement devices and/or precision actuation devices (eg piezo-electrics) to identify and correct for misalignments.

The optical terminal 26 comprises transmit/receive optics 27, a telescope assembly 28, and a coarse pointing assembly 29. Further, the optical terminal 26 comprises a fine pointing assembly 30, which may include a point ahead mechanism.

The telescope assembly 28 and the coarse pointing assembly 29 operate as conventional Pointing, Acquisition and Tracking (PAT) system using closed loop feedback to point the downlink communication laser beam 5 produced by the classical optical communication laser 20 at the optical receiver of the OGR 3, using the uplink communications laser beam 6 as a beacon or reference, as discussed above. At the same time the OGR 3 points the uplink communication laser beam 6 at the telescope assembly 28 of the satellite 2 using closed loop feedback and using the downlink communications laser beam 5 as a beacon or reference, as discussed above. Accordingly, the uplink and downlink communication laser beams are co-aligned by the two closed loop tracking systems on the satellite 2 and the OGR 3 respectively. Optionally, either or both of the downlink communication laser beam 5 and the uplink communication laser beam 6 may be directed in a 'point ahead' manner to allow for expected relative movement of the satellite 2 and the OGR 3.

The transmit/receive optics 27 separate the received uplink communication laser beam 6 from the laser beams to be transmitted, such as the quantum laser beam 4, the downlink communication laser beam 5, and any other laser beams, such as a synchronisation laser beam from the synchronisation laser 24. The transmit/receive optics 27 direct the uplink communication laser beam 6 to a communications laser transceiver 31.

The communications laser transceiver 31 is arranged to extract message data from the received uplink communication laser beam 6, and to provide this message data to other parts of the satellite 2. Further, the communications laser transceiver 31 is arranged to modulate the classical optical communication laser 20 based upon message data provided by other parts of the satellite 2, so that this message data can be transmitted to the OGR 3 by the downlink communication laser beam 5.

After the telescope assembly 28 and the coarse pointing assembly 29 have aligned the downlink communication laser beam 5 produced by the classical optical communication laser 20 at the optical receiver of the OGR 3, using the uplink communications laser beam 6 as a beacon or reference, using the closed loop approach described above, the process of correcting any pointing offset of the quantum beam 4 is carried out as discussed above. It will be understood that the downlink laser beam 5 and the quantum beam 4 must sufficiently closely aligned by the optics assembly 25 that correcting the alignment of the quantum beam 4 will result in only a relatively small misalignment of the downlink laser beam 5, and not a misalignment of the downlink laser beam 5 sufficiently large to prevent the PAT system from functioning.

The satellite 2 further comprises a quantum beam alignment compensator 32, which cooperates with the fine pointing assembly 30 and the OGR 3 to form a closed loop compensation system to correct for misalignment and/or pointing offset of the quantum beam 4 using the method of FIGS. 3A to 3D.

In the illustrated example the optics assembly 25 and the optical terminal 26 are separate elements. This is not essential. In alternative examples the optics assembly 25 may be incorporated into the optical terminal 26.

Figure 5:
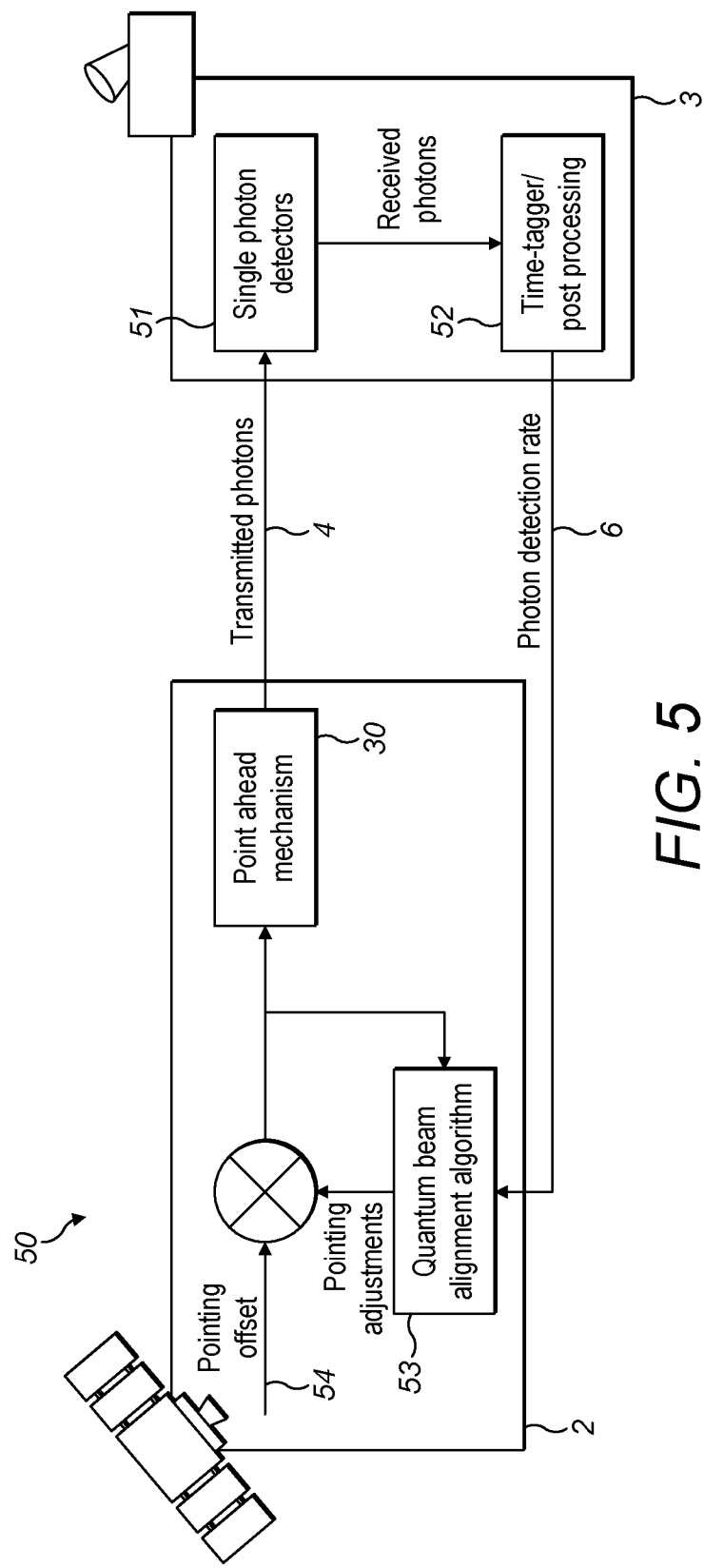
FIG. 5 is a schematic diagram illustrating a closed loop pointing offset correction system arranged to carry out the process of FIGS. 3A to 3D.

FIG. 5 shows a more detailed schematic diagram of a closed loop compensation system 50 to correct for misalignment and/or pointing offset of the quantum beam 4 according to the method of FIGS. 3A to 3D.

As shown in FIG. 5, in operation of the closed loop compensation system 50, the quantum beam alignment compensator 32 controls the fine pointing assembly 30 to execute precise, known offset motions on the downlink quantum beam 4 by making micro adjustments of the fine pointing assembly 30, which is part of the optical terminal 26 on the satellite 2. As is discussed above, these offset motions may be random adjustments. Other possibilities are discussed below. A sequence of offset motions is carried out during each SQKD session while the satellite 2 is in communication with the OGR 3.

The transmitted photons of the quantum beam 4 received at the OGR 3 are detected by one or more single photon detectors 51 of the OGR 3. In the illustrated example the OGR 3 uses the BB84 polarisation encoded protocol and there are four single photon detectors 51, one arranged to detect photons in each of four polarised channels having different polarisation states. The OGR 3 comprises a time tagger and post processing module 52 which is used to identify and record the time of receipt of the detected single photons to allow matching of photon emissions at the satellite 2 with photon detection at the OGR 3. The time tagger and post processing module 52 is further arranged to determine the photon detection rate at the OGR 3 across the one or more single photon detectors 51, and to periodically report the photon detection rate to the satellite 2 using the uplink communication laser beam 6.

At the satellite 2, the communications laser transceiver 31 extracts the received photon detection rate reports from the received uplink communication laser beam 6, and passes them to the quantum beam alignment compensator 32.

The quantum beam alignment compensator 32 processes the photon detection rate reports using an algorithm 53. The algorithm 53 carries out the process as illustrated in FIGS. 3A to 3D to optimise the pointing of the quantum beam 4 by controlling the fine pointing assembly 30 of the optical terminal 26 to make execute a series of precise, known offset motions in the pointing direction of the downlink quantum beam 4 based on the effect of the previous adjustment(s) on the photon detection rate at the one or more single photon detectors 51 of the OGR 3 indicated by the received photon detection rate reports.

In some examples, the algorithm 53 operates by selectively reversing or retaining the offset motions based on the resulting effect on the photon detection rate indicated by the received photon detection rate reports.

In some examples, the optimum correction offset to the pointing direction of the downlink quantum beam 4 at the end of an SQKD session is stored by the quantum beam alignment compensator 32, and is used as an initial pointing direction offset 54 at the start of a subsequent SQKD session. This may accelerate the convergence of the closed loop compensation system 50 on an optimum pointing direction offset value, and so increase the average key transfer rate, and the total amount of keys or key material transferred, during an SQKD session.

The algorithm 53 may generate the offset motions by using a number of different methods. As is discussed above, in some examples, the offset motions in the pointing direction of the downlink quantum beam 4 may be random in direction, with the offset in the pointing direction gradually converging on, or creeping towards, an optimum value. In some examples the offset motions may be random in both direction and amount, or random in direction and random in amount between a predetermined maximum and minimum amount. In other examples, the offset motions in the pointing direction may follow a pre-defined scanning motion, such as a conical scan, or a scan across a grid. In other examples, the offset motions may start with a series of predetermined offsets, such as three offsets, and the quantum beam alignment compensator 32 may then use the known series of offsets and the resulting effects on the photon detection rate to determine a gradient of the photon detection rate relative to the alignment offset, and use this determined gradient to guide or direct subsequent offsets. The offset motions used may be controlled using a PID or model based control approach. The examples described are not exhaustive, and other methods may be used.

As describe above, the photon detection rate monitored by the OGR and communicated to the Satellite as part of the quantum link's closed-loop tracking approach is affected by numerous parameters, e.g. changing link distance between the satellite 2 and the OGR 3, and atmospheric turbulence. When the quantum beam alignment algorithm injects random pointing offsets, the quantum beam alignment compensator 32 will account for these parameter changes when assessing the impact of the pointing offsets on the photon detection rate.

In some examples, in addition to the closed loop approach to optimise the pointing direction of the quantum beam 4 to maximise the photon detection rate and the key rate in operation during an SQKD session as described above, the closed loop compensation system 50 may be further arranged to carry out calibration when not in operation, that is, outside of an SQKD session. In such examples having multiple quantum channels, the method described above of making fine adjustments offsetting the pointing direction of the quantum beam 4 relative to the classical laser beam forming the downlink laser beam and responding to changes in the photon detection rate may be used in a calibration mode for each quantum channel separately, for example, for each different polarisation quantum channel where the BB84 protocol is used. This information may be used by the satellite 2 to carry out corrections to the alignment of the different lasers on board the satellite 2 using dedicated actuator mechanisms, such as the optional precision actuation devices which may be comprised in the optics assembly 25.

This may enable more accurate alignment of the different quantum channels, allowing any information leakage by deduction based on the spatial alignment of the quantum encoded photons in the quantum beam to be minimised. Such possible information leakage may compromise the key rate achieved in practice, because it may be necessary to use additional privacy amplification protections in order to mitigate the insight an attacker can get through this side channel.

The embodiments described above have a quantum downlink beam from a satellite to a ground station, with various components located on the satellite or at the ground station. In alternative examples, this arrangement may be reversed, and the SQKD system may comprise a quantum uplink beam from a ground station to satellite, with the locations of the various system components being reversed. Other arrangements are also possible, where the quantum beam it between two satellites or two ground stations, with the various system components being arranged appropriately at the transmission and reception ends of the quantum beam.

In the embodiments described above, a single quantum beam between a satellite and a ground station is shown. In some examples, such as systems using entanglement based protocols, such as the BBM92 protocol, there may be two quantum beams used simultaneously between a satellite and two different ground stations, with each quantum beam being directed by a separate dedicated optical terminal on the satellite. In such examples, both of the quantum beams may be independently adjusted by the methods described above.

In the embodiments described above, the quantum laser beam is coaxial with the classical laser beam used as a beacon for the initial alignment of the uplink and downlink classical laser beams. This is not essential. In other examples, the quantum laser may be parallel and spaced apart from the classical laser beam used as a beacon.

In the embodiments described above, the quantum beam and the downlink communication beam have different wavelengths, and are separated at the OGR based on their different wavelengths. In other examples, different separation techniques may be used, and these different beams may have the same wavelength.

In the embodiments described above, the satellite 2 uses a quadrant detector to track the uplink laser beam and drive adjustment of the pointing of the downlink laser beam, while the OGR 3 uses a tracking camera to track the downlink laser beam and drive adjustment of the pointing of the uplink laser beam. This is not essential, and alternative tracking means may be used. Further, it is not essential for the satellite 2 and the OGR 3 to use different tracking means, they may use the same type of tracking means.

In the embodiments described above, the photon detection rate is measured using the time tagger of the OGR. This is convenient, because a time tagger is generally already present. However, this is not essential, and dedicated electronics may be used to determine the photon detection rate.

In the embodiments described above, separate coarse and fine adjustment systems are used to control the direction of the laser beams. This is not essential, and an integrated adjustment system may be used if preferred.

The embodiments described above use the uplink and downlink communication lasers as beacons for the initial alignment. This is not essential. In some examples dedicated beacon laser(s) separate from the communication laser(s) may be used for the initial alignment instead of one, or both, of the uplink and downlink communication lasers.

The embodiments described above use uplink and downlink communication lasers as beacons for the initial alignment. This is not essential. In other examples, one or more dedicated beacon laser(s) may be used for the initial alignment, and alternative communication means such as an RF communications link may be used instead of one, or both, of the uplink and downlink communication lasers.

In the embodiments described above the faint pulses are single photon events. In other examples, these may be multi-photon events.

In the embodiments described above the system comprises a single optical ground receiver (OGR). The system may comprise any number of OGRs.

In the embodiments described above the system comprises a single satellite. The system may comprise any number of satellites.

In the embodiments described above the system is a quantum key distribution system. In other examples other cryptographic items could be distributed/delivered in addition to, or as an alternative to, encryption keys. Examples of such other cryptographic items include cryptographic tokens, cryptographic coins, or value transfers.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a system may be a distributed system.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of aligning a quantum laser beam with a receiver, the method comprising:
   generating a quantum laser beam and a first classical, non-quantum, laser beam at a transmitter, the quantum laser beam and the first classical laser beam being substantially aligned in direction;
   transmitting the quantum laser beam and the first classical laser beam; and
   directing the quantum laser beam and first classical laser beam to a receiver;
   measuring the photon reception rate from the quantum laser beam at the receiver, and reporting the photon reception rate to the transmitter;
   at the transmitter, making a series of adjustments to the direction of the transmitted quantum laser beam and the first classical laser beam, and monitoring the reported photon reception rate;
   wherein, each of the series of adjustments is based, at least in part, on the effect of the preceding adjustment on the reported photon detection rate.

2. The method of claim 1, in which:
   if one of the series of adjustments results in a reduction in the reported photon reception rate, reversing that adjustment; and
   if one of the series of adjustments results in an increase in the reported photon reception rate, retaining that adjustment.

3. The method of claim 1, in which the series of adjustments begins with a plurality of predetermined adjustments, and the method further comprises:
   using the effects of the plurality of predetermined adjustments on the reported photon detection rate to determine a gradient of the photon detection rate relative to the adjusted direction of the transmitted quantum laser beam; and
   basing subsequent adjustments, at least in part, on the determined gradient.

4. The method of claim 1, in which directing the quantum laser beam and first classical laser beam to the receiver is carried out using a coarse pointing system, and the series of adjustments to the direction of the transmitted quantum laser beam and the first classical laser beam are carried out using a separate fine pointing system.

5. The method of claim 1, and further comprising transmitting a second classical, non-quantum, laser beam from the receiver to the transmitter.

6. The method of claim 1, in which the first classical laser beam is used as a communication link from the transmitter to the receiver.

7. The method of claim 5, in which the transmitter and receiver cooperate to direct the first classical laser beam to the receiver using a first closed loop control method which uses the second classical laser beam as a beacon, and to direct the second classical laser beam to the transmitter using a first closed loop control method which uses the second classical laser beam as a beacon.

8. The method of claim 1, in which the monitoring the reported photon reception rate comprises measuring the photon reception rate for a period of time after each of the series of adjustments, the period of time is a configurable time period determined at the transmitter, and the first classical laser beam is used as a communication link to communicate the configurable time period from the transmitter to the receiver.

9. The method of claim 1, in which the transmitter is a satellite and the receiver is a ground station.

10. The method of claim 1, in which the transmitter is a ground station and the receiver is a satellite.

11. The method of claim 10, in which the ground station comprises an optical ground receiver (OGR).

12. A system for aligning a quantum laser beam with a receiver, the system comprising:
a transmitter arranged to:
generate a quantum laser beam and a first classical, non-quantum, laser beam, the quantum laser beam and the first classical laser beam being substantially aligned in direction;
transmit the quantum laser beam and the first classical laser beam; and
direct the quantum laser beam and first classical laser beam to a receiver; and
a receiver arranged to:
measure the photon reception rate from the quantum laser beam;
and report the photon reception rate to the transmitter;
wherein the transmitter is further arranged to make a series of adjustments to the direction of the transmitted quantum laser beam and the first classical laser beam, and monitor the reported photon reception rate; and
wherein, each of the series of adjustments is based, at least in part, on the effect of the preceding adjustment on the reported photon detection rate.

13. The system of claim 12, in which the transmitter is arranged to:
if one of the series of adjustments results in a reduction in the reported photon reception rate, reverse that adjustment; and
if one of the series of adjustments results in an increase in the reported photon reception rate, retain that adjustment.

14. The system of claim 12, in which the series of adjustments begins with a plurality of predetermined adjustments, and the transmitter is further arranged to:
use the effects of the plurality of predetermined adjustments on the reported photon detection rate to determine a gradient of the photon detection rate relative to the adjusted direction of the transmitted quantum laser beam; and
base subsequent adjustments, at least in part, on the determined gradient.

15. The system of claim 12, in which the transmitter comprises a course pointing system arranged to direct the quantum laser beam and first classical laser beam to the receiver, and comprises a separate fine pointing system arranged to carry out the series of adjustments to the direction of the transmitted quantum laser beam and the first classical laser beam.

16. The system of claim 12, wherein the receiver is further arranged to transmit a second classical, non-quantum, laser beam to the transmitter.

17. The system of claim 12, in which the monitoring the reported photon reception rate comprises measuring the photon reception rate for a period of time after each of the series of adjustments, the period of time is a configurable time period, wherein the transmitter is arranged to determine the configurable period of time, and to use the first classical laser beam as a communication link to communicate the configurable time period to the receiver.

18. The system of claim 12, in which the transmitter is a satellite and the receiver is a ground station.

19. The system of claim 12, in which the transmitter is ground station and the receiver is a satellite.

20. A method of aligning a quantum laser beam with a receiver, the method comprising:
generating a quantum laser beam and a first classical, non-quantum, laser beam at a transmitter, the quantum laser beam and the first classical laser beam being substantially aligned in direction;
transmitting the quantum laser beam and the first classical laser beam; and
directing the quantum laser beam and first classical laser beam to a receiver;
making a series of adjustments to the direction of the transmitted quantum laser beam and the first classical laser beam; and
receiving reports of the photon reception rate from the receiver;
wherein, each of the series of adjustments is based, at least in part, on the effect of the preceding adjustment on the reported photon detection rate.

* * * * *